US006536206B2

(12) United States Patent
Hook, Jr. et al.

(10) Patent No.: US 6,536,206 B2
(45) Date of Patent: Mar. 25, 2003

(54) APPARATUS FOR DECREASING COMBUSTOR EMISSIONS

(75) Inventors: Richard B. Hook, Jr., Sharonville, OH (US); M. Waseem Adhami, Fairfield, OH (US); Narendra D. Joshi, Cincinnati, OH (US)

(73) Assignee: General Electric Co., Schenectady, NY (US)

(*) Notice: Subject to any disclaimer, the term of this patent is extended or adjusted under 35 U.S.C. 154(b) by 0 days.

(21) Appl. No.: 10/176,875

(22) Filed: Jun. 21, 2002

(65) Prior Publication Data

US 2003/0005704 A1 Jan. 9, 2003

Related U.S. Application Data

(62) Division of application No. 09/560,459, filed on Apr. 28, 2000, now Pat. No. 6,449,953.

(51) Int. Cl.[7] .................................................. F02C 3/30
(52) U.S. Cl. ........................................................ 60/39.53
(58) Field of Search ................................ 60/39.26, 39.3, 60/39.53, 39.55, 39.58, 39.59

(56) References Cited

U.S. PATENT DOCUMENTS 2,974,482 A * 3/1961 Kelley ........................... 60/39.3
3,100,964 A * 8/1963 Bevers et al. ................. 60/39.3

OTHER PUBLICATIONS

Hill et al. *Mechanics And Thermodynamics Of Propulsion* Addison–Wesley; Reading, Mass. 1965, p. 218.*

* cited by examiner

*Primary Examiner*—Louis J. Casaregola
(74) *Attorney, Agent, or Firm*—William Scott Andes; Armstrong Teasdale LLP; Robert B. Reeser, III

(57) ABSTRACT

A gas turbine engine includes a compressor rotor assembly including a first rotor, a combustor configured to operate with a fuel/air mixture equivalence ratio less than one, and a water injection assembly. The water injection assembly includes a water delivery system including a first plurality of spray nozzles to supply water upstream from the first rotor. The water being supplied to the first rotor is atomized with the first plurality of spray nozzles prior to being supplied to the engine to lower the emissions generated by the combustor.

13 Claims, 3 Drawing Sheets

APPARATUS FOR DECREASING COMBUSTOR EMISSIONS

This is a division of application Ser. No. 09/560,459 filed Apr. 28, 2000 (U.S. Pat. No. 6,449,953).

BACKGROUND OF THE INVENTION

This application relates generally to gas turbine engines and, more particularly, to compressors for gas turbine engine.

Air pollution concerns worldwide have led to stricter emissions standards. These standards regulate the emission of oxides of nitrogen (NOx), unburned hydrocarbons (HC), and carbon monoxide (CO) generated as a result of gas turbine engine operation. In particular, nitrogen oxide is formed within a gas turbine engine as a result of high flame temperatures. Often making modifications to a gas turbine engine in an effort to reduce nitrous oxide emissions has an adverse effect on operating performance levels of the associated gas turbine engine.

Known gas turbine engines often have attempted to reduce nitrous oxide emissions by increasing airflow through the gas turbine engine during operating conditions. Gas turbine engines include preset operating parameters and any such airflow increases are limited by the preset operating parameters including turbine nozzle cooling parameters. As a result, to increase the airflow within the gas turbine engine, the gas turbine engine and associated components should be modified to operate at new operating parameters.

Because such gas turbine engine modifications are labor-intensive and time-consuming, users are often limited to derating the operating power capability of the gas turbine engine and prevented from operating the gas turbine engine at fill capacity. Such derates do not limit an amount of nitrous oxide formed as the engine operates at full capacity, but instead limit the operating capacity of the gas turbine engine.

BRIEF SUMMARY OF THE INVENTION

In an exemplary embodiment, a gas turbine engine includes a compressor rotor assembly which effectively reduces an amount of nitrous oxide emissions formed by a the gas turbine engine. The gas turbine engine includes a combustor operable with a fuel/air mixture equivalence ratio less than one. The compressor assembly includes a first rotor, a second rotor, and a water injection assembly. The water injection assembly is mounted to the gas turbine engine and includes a water delivery system and an air delivery system. The water delivery system includes a plurality of spray nozzles connected to the gas turbine engine to inject water between the first rotor and the second rotor. The air delivery system includes a plurality of piping connected between the water delivery system and the gas turbine engine to supply bleed air to the water injection assembly to atomize the water being supplied to the gas turbine engine.

In operation, compressor bleed air exits a high pressure compressor and atomizes water flowing through the water delivery system. The spray nozzles direct a fine mist downstream towards an inlet of the high pressure compressor. The mist lowers a temperature of the airflow within the gas turbine engine which permits the airflow exiting the high pressure compressor to have an increased heat capacity. The increased heat capacity reduces flame temperatures within the gas turbine engine and as the flame temperatures are reduced, less nitrous oxide emissions are generated. As a result, either nitrous oxide emissions are improved for specified gas turbine engine operating power levels, or the gas turbine engine has an increased operating power level for a specified nitrous oxide emission level.

DETAILED DESCRIPTION OF THE INVENTION

Figure 1:
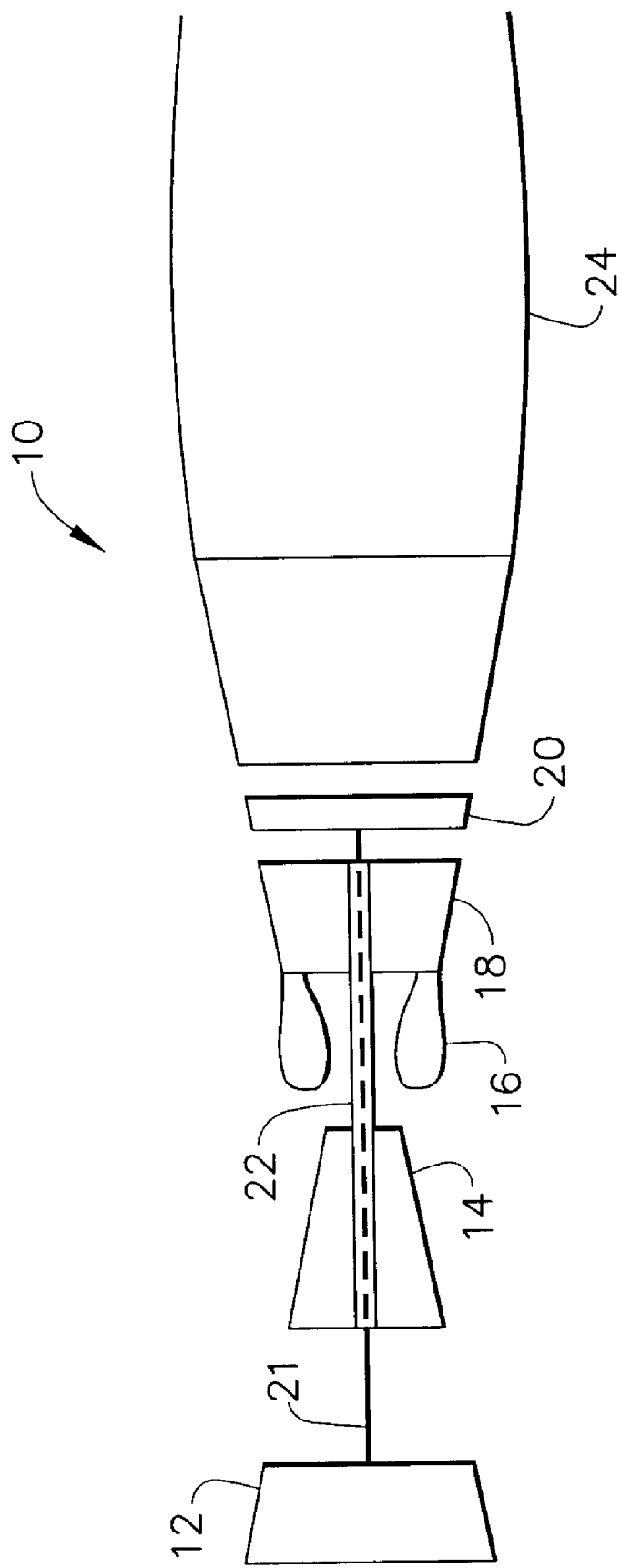
FIG. 1 is a schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Because combustor 16 is a lean premix combustor, a fuel/air mixture supplied to combustor 16 contains more air than is required to fully combust the fuel. Accordingly, a fuel/air mixture equivalence ratio for combustor 16 is less than one. Compressor 12 and turbine 20 are coupled by a first shaft 21, and compressor 14 and turbine 18 are coupled by a second shaft 22. A load (not shown) is also coupled to gas turbine engine 10 with first shaft 21.

In operation, air flows through low pressure compressor 12 and compressed air is supplied from low pressure compressor 12 to high pressure compressor 14. The highly compressed air is delivered to combustor 16. Airflow (not shown in FIG. 1) from combustor 16 drives turbines 18 and 20 and exits gas turbine engine 10 through a nozzle 24.

Figure 2:
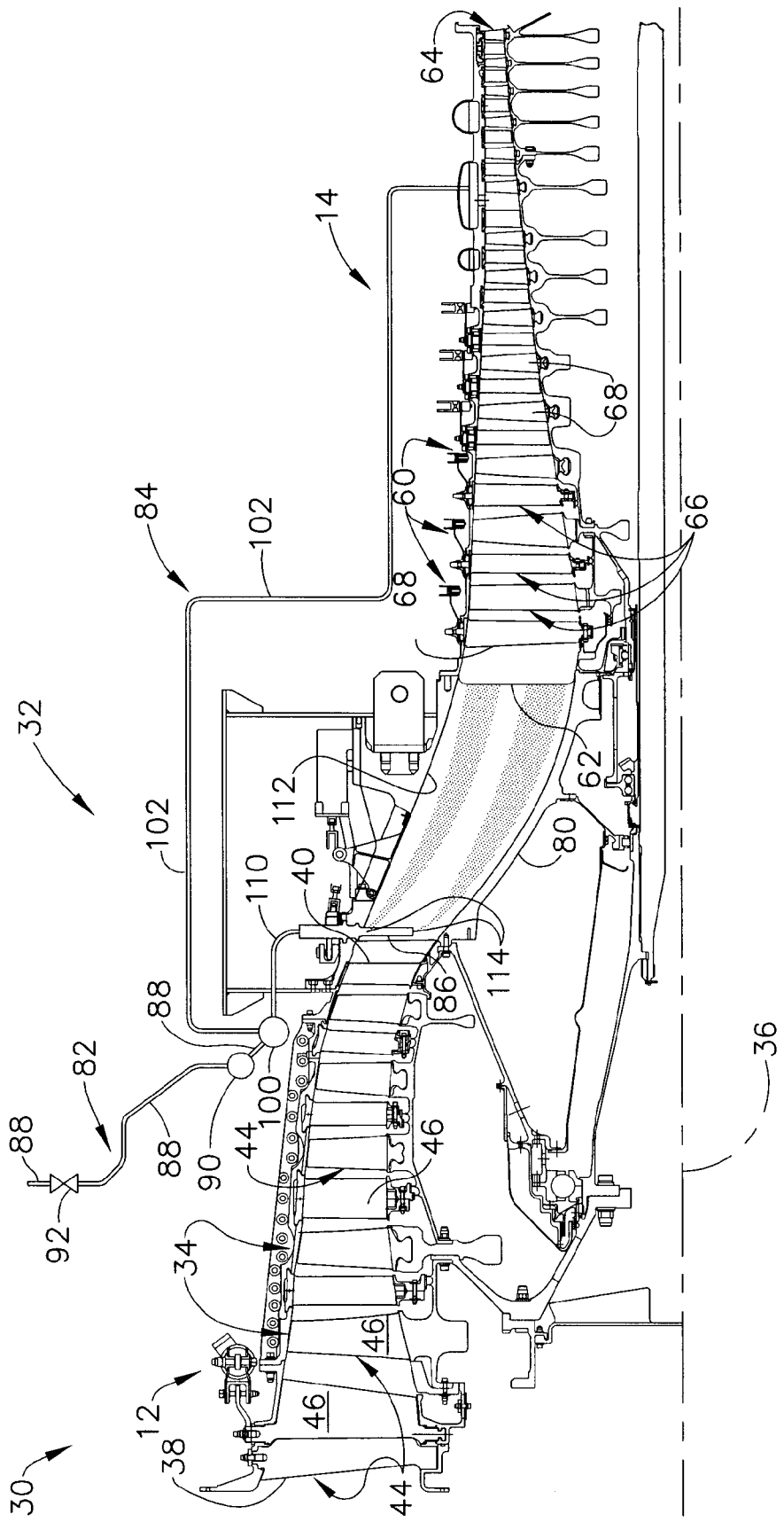
FIG. 2 is a side schematic illustration of a portion of a water injection assembly used with the gas turbine engine shown in FIG. 1.

FIG. 2 is a side schematic illustration of a portion of a compressor rotor assembly 30 and a water injection assembly 32 used with gas turbine engine 10 (shown in FIG. 1). Compressor rotor assembly 30 includes low pressure compressor 12 and high pressure compressor 14. Low pressure compressor 12 includes a plurality of rotors 34 coupled together and coaxial with an axial centerline axis 36 of gas turbine engine 10. Rotors 34 extend axially along center line axis 36 from an inlet side 38 of low pressure compressor 12 to an exhaust side 40 of low pressure compressor 12.

Each low pressure compressor rotor 34 is formed by one or more bladed disks 44, and each bladed disk 44 includes a plurality of blades 46 extending radially outwardly from gas turbine engine centerline axis 36. Each row of bladed disks 44 is sometimes referred to as a rotor stage. Blades 46 cooperate with a motive or working fluid, such as air, and compress the motive fluid in succeeding rotor stages as blades 46 rotate about centerline axis 36.

High pressure compressor 14 includes a plurality of rotors 60 coupled together coaxially with gas turbine engine centerline axis 36. Rotors 60 extend axially along center line axis 36 from an inlet side 62 of high pressure compressor 14 to an exhaust side 64 of high pressure compressor 14. Each high pressure compressor rotor 60 is formed by one or more bladed disks 66, and each bladed disk 66 includes a plurality of blades 68 extending radially outwardly from gas turbine engine centerline axis 36. Each row of bladed disks 66 is sometimes referred to a rotor stage. Blades 68 cooperate with a motive or working fluid, such as air, and compress the motive fluid in succeeding rotor stages as blades 68 rotate about centerline axis 36. A duct 80 extends from low pressure compressor exhaust side 40 to high pressure compressor inlet side 62. Duct 80 is annular and directs the motive or working fluid exiting low pressure compressor 12 to high pressure compressor 14.

Water injection assembly 32 supplies water to gas turbine engine 10 within duct 80 and includes a water delivery system 82 and an air delivery system 84. Alternatively, in another embodiment, water delivery system does not include air delivery system 84 and includes a plurality of pressure atomized nozzles (not shown) to atomize the water. Water delivery system 82 includes a first plurality of spray nozzles 86, a plurality of piping 88, a manifold 90, and a metering valve 92. Piping 88 connects water injection assembly 32 to a water supply source (not shown) and extends between the water supply source to metering valve 92. Metering valve 92 controls an amount of water entering water injection assembly 32 from the water supply source. Additional piping 88 extends between metering valve 92 and manifold 90. Manifold 90 is connected with additional piping 88 to an air manifold 100 and supplies a consistent water flow to water injection assembly 32. Manifold 90 is annular and is circumferentially positioned around low pressure compressor 12.

Air delivery system 84 includes air manifold 100 and piping 102. Piping 102 connects air delivery system 84 to gas turbine engine 10 and permits air delivery system 84 to receive bleed air from high pressure compressor 14. In one embodiment, piping 102 is attached to gas turbine engine 10 and receives bleed air from an eighth stage of high pressure compressor 14. Piping 102 extends between high pressure compressor 14 and air manifold 100. In an alternative embodiment, water injection assembly 32 includes a blank-off/spacer (not shown) positioned to control an amount of bleed air exiting high pressure compressor 14 to air delivery system 84 and air manifold 84.

Air manifold 100 is annular and is circumferentially positioned around low pressure compressor 12. Air manifold 100 provides a consistent bleed air flow to water injection assembly 32. A plurality of feeder tubes 110 extend from air manifold 100 to spray nozzles 86. In one embodiment, feeder tubes extend to twenty-four spray nozzles 86. Feeder tubes 110 permit bleed air and water to flow from air manifold 100 to spray nozzles 86. Spray nozzles 86 extend radially inward towards gas turbine engine centerline axis 36 from an outer wall 112 of duct 80 and include a plurality of spray outlets 114. The bleed air forces the water from air manifold 100 and atomizes the water into droplets. The droplets are forced into the flow path through spray nozzle spray outlets 114. Water droplets exit spray nozzles 86 in a fine mist directed towards high pressure compressor inlet side 62. In one embodiment, the water droplets exit spray nozzle spray outlets 114 with a mean particle diameter size of approximately 20 microns.

During operation, a working fluid, such as air, is compressed while flowing through low pressure compressor 12. The working fluid exits low pressure compressor 12 and is routed through duct 80 to high pressure compressor 14. Accordingly, as air flows through gas turbine engine 10, compressor bleed air flows from high pressure compressor 14 to air manifold 100. Simultaneously, water flows through metering valve 92 to water delivery manifold 90 which provides a consistent water flow to spray nozzles 86.

Bleed air exiting air manifold 100 atomizes and forces the water through water delivery spray nozzles 114 in a fine mist towards high pressure compressor 14 from duct 80. The mist lowers a temperature of the airflow within gas turbine engine 10 creating an intercooling effect. The intercooling effect permits the fluid exiting high pressure compressor 14 to have an increased heat capacity, which in turn, reduces flame temperatures within gas turbine engine 10. As the flame temperatures are reduced, less nitrous oxide emissions are generated. As a result, either nitrous oxide emissions are improved for specified gas turbine engine operating power levels, or gas turbine engine 10 has an increased operating power level for a specified nitrous oxide emission level. Additionally, because compressor exit temperatures for given output levels are reduced, less work is required by compressors 12 and 14.

Figure 3:
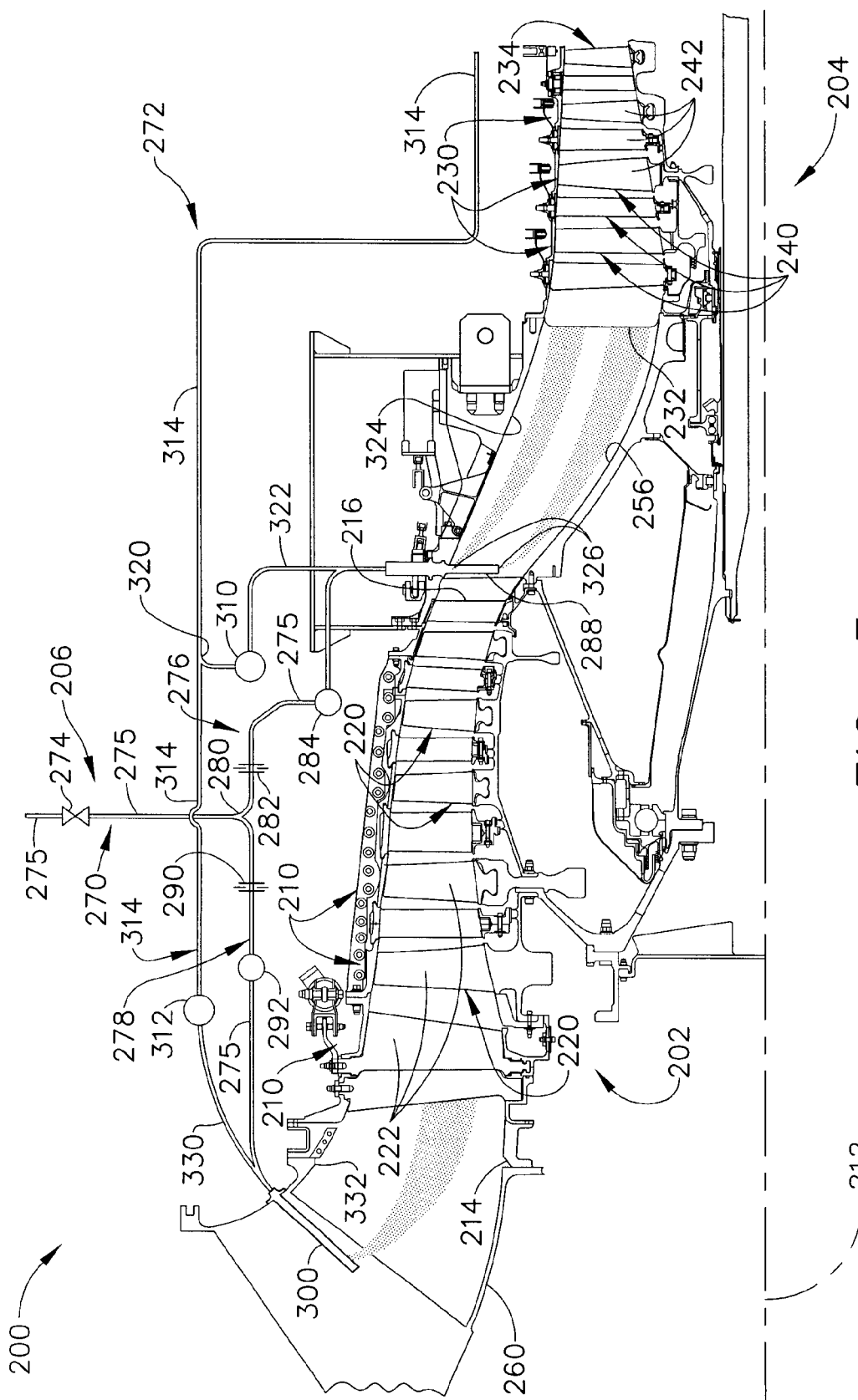
FIG. 3 is side schematic illustration of an alternative embodiment of a water injection assembly that may be used with the gas turbine engine shown in FIG. 1.

FIG. 3 is a side schematic illustration of a portion of a compressor rotor assembly 200 used with a gas turbine engine (not shown) similar to gas turbine engine 10 (shown in FIG. 1). In one embodiment, the gas turbine engine is an LM6000 available from General Electric Aircraft Engines, Cincinnati, Ohio. Compressor rotor assembly 200 includes a low pressure compressor 202 and a high pressure compressor 204. Gas turbine engine 10 also includes a water injection assembly 206. Low pressure compressor 202 includes a plurality of rotors 210 coupled together and coaxial with an axial centerline axis 212 of the gas turbine engine. Rotors 210 extend axially along centerline axis 212 from an inlet side 214 of low pressure compressor 202 to an exhaust side 216 of low pressure compressor 202.

Each low pressure compressor rotor 210 is formed by one or more bladed disks 220, and each bladed disk 220 includes a plurality of blades 222 extending radially outwardly from gas turbine engine centerline axis 212. Each row of bladed disks 220 is sometimes referred to a rotor stage. Blades 222 cooperate with a motive or working fluid, such as air, and compress the motive fluid in succeeding rotor stages as blades 222 rotate about centerline axis 212.

High pressure compressor 204 includes a plurality of rotors 230 coupled together coaxially with gas turbine engine centerline axis 212. Rotors 230 extend axially along centerline axis 212 from an inlet side 232 of high pressure compressor 204 to an exhaust side 234 of high pressure compressor 204. Each high pressure compressor rotor 230 is formed by one or more bladed disks 240, and each bladed disk 240 includes a plurality of blades 242 extending radially outwardly from gas turbine engine centerline axis 212. Each row of bladed disks 240 is sometimes referred to a rotor stage. Blades 242 cooperate with a motive or working fluid, such as air, and compress the motive fluid in succeeding rotor stages as blades 242 rotate about centerline axis 212.

A duct 256 extends from low pressure compressor exhaust side 216 to high pressure compressor inlet side 234. Duct 256 is annular and directs the motive or working fluid exiting low pressure compressor 202 to high pressure compressor inlet side 232. An inlet duct 260 directs the motive working fluid towards low pressure compressor inlet side 214.

Water injection assembly 206 injects water to the gas turbine engine simultaneously within ducts 260 and 256 and includes a water delivery system 270 and an air delivery system 272. Alternatively, water injection assembly 206 injects water to either duct 260 or duct 256 separately and independently. In another embodiment, water injection assembly 206 does not include air delivery system 272 and includes a plurality of pressure atomized nozzles (not shown) to atomize the water. Water delivery system 270 includes a metering valve 274, a plurality of piping 275, a high pressure compressor portion 276, and a low pressure compressor portion 278. Piping 275 connects water injection assembly 206 to a water supply source (not shown) and extends from the water supply source to metering valve 274. Metering valve 274 controls an amount of water flowing from the water supply source to water injection assembly high pressure compressor portion 276 and water injection assembly low pressure compressor portion 278. Additional piping 275 extends between metering valve 274 and a T-fitting 280. T-fitting 280 splits the water flow between water injection assembly system portions 276 and 278.

A portion of the water entering T-fitting 280 is directed into water assembly high pressure compressor portion 276 and through an orifice 282 in piping 275 to increase the pressure of the water before it flows into a water manifold 284. In another embodiment, water entering T-fitting 280 is directed into a first valve (not shown) disposed in high pressure compressor portion 276 to independently control the flow of water into high pressure compressor portion 276. The remaining water is directed into water assembly low pressure compressor portion 278. In an alternative embodiment, the remaining water is directed into a second valve (not shown) disposed in low pressure compressor portion 278 to independently control the flow of water into low pressure compressor portion 278. Manifold 284 is connected with additional piping 275 to a plurality of spray nozzles 288 positioned upstream from high pressure compressor inlet side 232. In one embodiment, water assembly high pressure compressor portion 276 includes twenty-four spray nozzles 288. Manifold 284 is annular and is circumferentially positioned around low pressure compressor 202 to supply a consistent water flow to spray nozzles 288. Spray nozzles 288 are positioned circumferentially around duct 256 downstream of low pressure compressor exhaust side 216 and upstream of high pressure compressor inlet side 232. Water exiting spray nozzles 288 is directed into the gas turbine engine airflow towards high pressure compressor 204.

The remaining water entering T-fitting 280 is directed into water assembly low pressure compressor portion 278 and through an orifice 290. In one embodiment, orifices 290 and 282 are valves used to selectively control a flow of water. Orifices 290 and 282 provide a proper mixture of water between water assembly low pressure compressor portion 278 and water assembly high pressure compressor portion 276. Manifold 292 is connected with additional piping 275 to a plurality of spray nozzles 300 positioned upstream from low pressure compressor inlet side 214. In one embodiment, water assembly low pressure compressor portion 278 includes twenty-three spray nozzles 300. Manifold 292 is annular and is circumferentially positioned around low pressure compressor 202 upstream of high pressure compressor portion manifold 288 and supplies a consistent water flow to spray nozzles 300. Spray nozzles 300 are positioned circumferentially around inlet duct 260 upstream of low pressure compressor inlet side 214. Water exiting spray nozzles 300 is directed downstream into the gas turbine engine airflow towards low pressure compressor 202. In one embodiment, low pressure compressor portion spray nozzles 300 are identical to high pressure compressor portion spray nozzles 288.

Air delivery system 272 includes a first manifold 310, a second manifold 312, and a plurality of piping 314 and provides a consistent bleed air flow to water injection assembly 206. Piping 314 connects air delivery system 272 to the gas turbine engine and permits air delivery system 272 to receive bleed air from high pressure compressor 204. In one embodiment, piping 314 receives bleed air from an eighth stage of high pressure compressor 204. Piping 314 extends between high pressure compressor 204 and a splitter joint 320. In an alternative embodiment, air delivery system 272 includes a blank-off/spacer (not shown) to control the bleed air flow to water injection assembly 206.

A portion of the air entering splitter joint 320 is directed towards first manifold 310 and the remaining air is directed towards second manifold 312. First manifold 310 is annular and is circumferentially positioned around low pressure compressor 202 downstream from second manifold 312. A plurality of feeder tubes 322 extend from first air manifold 310 to spray nozzles 288. Feeder tubes 322 permit bleed air and water to flow from air manifold 310 to spray nozzles 288. Spray nozzles 288 extend radially inward towards gas turbine engine centerline axis 212 from an outer wall 324 of duct 256 and include a plurality of spray outlets 326. The bleed air atomizes the water being sent to spray nozzles 288 to create water droplets. The droplets are forced into the flow path through spray nozzle spray outlets 326 in a fine mist directed towards high pressure compressor inlet side 232. In one embodiment, the water mist exits spray nozzle spray outlets 326 with a mean particle diameter size of approximately 20 microns.

The remaining air entering splitter joint 320 is directed towards second manifold 312. Second manifold 312 is annular and is circumferentially positioned around low pressure compressor 202 upstream from first manifold 310. A plurality of feeder tubes 330 extend from second air manifold 312 to spray nozzles 300. Feeder tubes 330 permit bleed air and water to flow from second air manifold 312 to spray nozzles 300. Spray nozzles 300 extend radially inward towards gas turbine engine centerline axis 212 from an outer wall 332 of inlet duct 260 and include a plurality of spray outlets 334. The bleed air atomizes the water being sent to spray nozzles 300 to create water droplets. The droplets are forced into the flow path through spray nozzle spray outlets 334 in a fine mist directed towards low pressure compressor inlet side 214. In one embodiment, the water mist exits spray nozzle spray outlets 332 with a mean particle diameter size of 20 microns.

During operation, a working fluid, such as air, is routed through low pressure compressor 202 with inlet duct 260. The compressed fluid flow exits low pressure compressor 202 and is routed through duct 256 to high pressure compressor 204. Accordingly, as air flows through the gas turbine engine, compressor bleed air flows from high pressure compressor 204 to air delivery system splitter joint 320. A portion of the air is directed towards air delivery system first manifold 310 and the remaining air is directed towards air delivery system second manifold 312. Simultaneously, water flows through metering valve 274 and is directed into water delivery high pressure compressor portion 276 and water delivery low pressure compressor portion 278.

Bleed air exiting air manifolds 310 and 312 atomizes the water flowing to water delivery spray nozzles 288 and 300, respectively, and creates a fine mist. The mist is directed towards high pressure compressor inlet side 232 and low pressure compressor inlet side 214, respectively. The mist creates a supersaturated condition at low pressure inlet side 214. As the mist flows through low pressure compressor 202 and high pressure compressor 204, the mist evaporates creating an intercooling effect within the gas turbine engine. The intercooling effect permits lower firing temperatures and lower compressor exit temperatures which permits fluid exiting high pressure compressor 14 to also have an increased heat capacity. The increased heat capacity reduces flame temperatures within the gas turbine engine and as the flame temperatures are reduced, less nitrous oxide emissions are generated. As a result, either nitrous oxide emissions are improved for specified gas turbine engine operating power levels, or the gas turbine engine has an increased operating power level for a specified nitrous oxide emission level.

The above-described compressor rotor assembly for a gas turbine engine is cost-effective and reliable. The water injection assembly effectively directs atomized air to the compressor rotor assembly to lower nitrous oxide emissions. As a result, nitrous oxide emissions for specified turbine operating power levels are lowered. Alternatively, the operating power level of the gas turbine engine is increased for a specified nitrous oxide emission level.

While the invention has been described in terms of various specific embodiments, those skilled in the art will recognize that the invention can be practiced with modification within the spirit and scope of the claims.

What is claimed is:

1. A water injection assembly for a gas turbine engine including at least one compressor, said water injection assembly comprising:
   a combustor configured to operate with a fuel/air mixture equivalence ratio less than one,
   a water delivery system comprising a first plurality of spray nozzles and a second plurality of spray nozzles, said water delivery system connected to the gas turbine engine, said first plurality of spray nozzles configured to spray water into the gas turbine engine upstream from the compressor to reduce emissions levels generated by said combustor, said second plurality of spray nozzles configured to spray water upstream from said first plurality of spray nozzles.

2. A water injection assembly in accordance with claim 1 wherein said water delivery system further comprises a metering valve and at least one manifold, said metering valve connected to said at least one manifold, said manifold connected to said first plurality of spray nozzles.

3. A water injection assembly in accordance with claim 2 wherein said first plurality of spray nozzles comprises 24 spray nozzles.

4. A water injection assembly in accordance with claim 3 further comprising an air delivery system comprising a plurality of piping, said air delivery system connected between said water delivery system and an air source.

5. A water injection assembly in accordance with claim 4 wherein said air delivery system further comprises at least one manifold connected to said air delivery system with said piping.

6. A water injection assembly in accordance with claim 1 wherein the gas turbine engine further includes a second compressor, said water delivery system further comprises at least two manifolds, said second plurality of spray nozzles configured to spray water into the gas turbine engine upstream of the second compressor.

7. A water injection assembly in accordance with claim 6 wherein said second plurality of spray nozzles comprises 23 spray nozzles, said air source is the gas turbine engine.

8. A gas turbine engine comprising:
   a first rotor;
   a combustor disposed downstream from said first rotor and coaxial with said first rotor, said combustor configured to operate with a fuel/air mixture equivalence ratio less than one; and
   a water injection assembly mounted to said gas turbine engine, said water injection assembly comprising a water delivery system comprising a plurality of first spray nozzles and a second plurality of spray nozzles connected to said gas turbine engine, said spray nozzles configured to inject water upstream from said first rotor, said second plurality of spray nozzles configured to inject water upstream from said first plurality of spray nozzles.

9. A gas turbine engine in accordance with claim 8 wherein said water delivery system further comprises a metering valve and at least one manifold, said metering valve connected to said manifold, said manifold connected to said first plurality of spray nozzles.

10. A gas turbine engine in accordance with claim 9 wherein said water delivery system first plurality of spray nozzles comprises 24 spray nozzles.

11. A gas turbine engine in accordance with claim 10 wherein said water delivery system further comprises an air delivery system comprising a plurality of piping connected between said water delivery system and the gas turbine engine.

12. A gas turbine engine in accordance with claim 11 wherein said air delivery system further comprises at least one manifold connected to said air delivery system with said piping.

13. A gas turbine engine in accordance with claim 12 further comprising a second rotor and a rotor shaft, said first rotor coupled co-axially to said second rotor, said first rotor downstream from said second rotor, said water delivery system second plurality of spray nozzles configured to inject water into the gas turbine engine upstream from said second rotor.

* * * * *